United States Patent
Ha et al.

(10) Patent No.: US 9,040,155 B2
(45) Date of Patent: May 26, 2015

(54) PRESSURE SENSITIVE ADHESIVE COMPOSITION FOR PROTECTIVE FILM HAVING ANTI-STATIC PROPERTY AND MANUFACTURING PROCESS THEREOF

(71) Applicant: LG CHEM. LTD., Seoul (KR)

(72) Inventors: Jae Woung Ha, Daejeon (KR); Young-Min Kim, Daejeon (KR); Jung Sup Han, Busan (KR); Kong Ju Song, Daejeon (KR); Kumhyoung Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/346,277

(22) PCT Filed: Oct. 22, 2012

(86) PCT No.: PCT/KR2012/008646
§ 371 (c)(1),
(2) Date: Mar. 20, 2014

(87) PCT Pub. No.: WO2013/069907
PCT Pub. Date: May 16, 2013

(65) Prior Publication Data
US 2015/0010753 A1 Jan. 8, 2015

(30) Foreign Application Priority Data
Nov. 8, 2011 (KR) .......................... 10-2011-0116000

(51) Int. Cl.
*C09J 133/14* (2006.01)
*C09J 7/02* (2006.01)
*C09J 133/04* (2006.01)
*C09J 4/06* (2006.01)

(52) U.S. Cl.
CPC .......... *C09J 133/14* (2013.01); *Y10T 428/2891* (2015.01); *Y10T 428/2848* (2015.01); *C09J 133/04* (2013.01); *C09J 4/06* (2013.01); *C09J 7/0217* (2013.01); *C09J 2433/00* (2013.01)

(58) Field of Classification Search
None
See application file for complete search history.

(56) References Cited

U.S. PATENT DOCUMENTS 7,339,002 B2 * 3/2008 Guo et al. ..................... 524/560

FOREIGN PATENT DOCUMENTS

| CN | 1827725 A | 9/2006 |
|---|---|---|
| JP | 09208910 | 8/1997 |
| JP | 09208910 A | 8/1997 |
| JP | 2006111846 | 4/2006 |
| JP | 2006111846 A | 4/2006 |
| JP | 2007-002111 A | 1/2007 |
| JP | 2008280375 | 11/2008 |
| JP | 2008280375 A | 11/2008 |
| JP | 2010-150515 | 7/2010 |
| JP | 2010150515 | 7/2010 |
| KR | 10-2004-0030919 A | 4/2004 |
| KR | 10-2006-0128659 A | 12/2006 |
| KR | 1020070041238 A | 4/2007 |
| KR | 1020090132564 A | 12/2009 |
| TW | 200643132 A | 12/2006 |
| TW | 200804494 A | 1/2008 |

* cited by examiner

*Primary Examiner* — Vu A Nguyen
(74) *Attorney, Agent, or Firm* — McKenna Long & Aldridge, LLP

(57) ABSTRACT

Provided is an adhesive composition for a protective film including an acrylic emulsion resin capable of providing contamination resistance on the film and low peel strength and minimizing generation of static electricity during peeling of the protective film. The acrylic emulsion resin includes a mixture including 80 to 99.9% by weight of a polymer of a (meth)acrylic acid ester monomer including a $C_1$-$C_{14}$ alkyl group and a (meth)acrylic acid ester monomer including an alkylene oxide unit, and 0.1 to 20% by weight of a monomer including a carboxyl group and/or a hydroxyl group or a combination thereof, and 5 to 30 parts by weight of a reactive emulsifier having a double bond structure radical-polymerizable with the polymer and including an alkylene oxide unit based on 100 parts by weight of the mixture.

15 Claims, No Drawings

PRESSURE SENSITIVE ADHESIVE COMPOSITION FOR PROTECTIVE FILM HAVING ANTI-STATIC PROPERTY AND MANUFACTURING PROCESS THEREOF

This application is a 35 USC §371 National Stage entry of International Application No. PCT/KR2012/008646, filed on Oct. 22, 2012, which claims priority from Korean Patent Application No. 10-2011-0116000, filed on Nov. 8, 2011, in the Korean Intellectual Property Office, all of which are incorporated herein by reference in its entirety.

FIELD OF THE INVENTION

The present invention relates to an adhesive composition for an anti-static protective film and a method of manufacturing the same, and more particularly, to an adhesive composition for an anti-static protective film including acrylic emulsion resin particles and an external cross-linking agent. The acrylic emulsion resin particles include a mixture including a polymer of a (meth)acrylic acid ester monomer including an alkyl group and a (meth)acrylic acid ester monomer including an alkylene oxide unit, and a monomer including a carboxyl group and/or a hydroxyl group or a combination thereof, and a reactive emulsifier having a double bond structure radical-polymerizable with the polymer and including an alkylene oxide unit, and a method of manufacturing the same.

BACKGROUND OF THE INVENTION

Generally, protective films are widely used for protecting the surface of metal products, plastic panels, or the like. Acrylic adhesive agents are widely used as adhesive agents for surface protective films due to weather resistance and transparency thereof. The acrylic adhesive agent may be a cross-linked copolymer of a (meth)acrylic acid alkyl ester monomer and a monomer including a functional group such as a carboxyl group, a hydroxyl group, or an epoxy group using a polyisocyanate compound, a melamine resin, an epoxy resin, or the like.

As objects to which the surface protective film are attached, polarizing films, plastic plates, electric appliances, automobiles, and the like need to be not only protected from adhering of contaminants such as dust but also protected from static electricity. Thus, anti-static functions as well as peel strength of a predetermined level of adhesive force or greater need to be provided to the surface protective film.

Generally, static electricity is classified into friction charging generated by friction between two different subjects and peeling charging generated by separation of a closely adhered subject. Static electricity can cause adhesion of foreign materials, such as dust, electrostatic breakdown of a device, malfunction of a measuring instrument, and fire.

Particularly, according to the widespread use of mobile computers, liquid crystal TVs, and multifunctional cell-phones, demand for liquid crystal displays continues to expand and thus inhibition of static electricity caused by integration of auxiliary devices has become a major concern.

In addition, as liquid crystal displays continue to increase in size, the size of a polarizing plate used in manufacture of liquid crystal display devices also increases. With higher processing speed, static electricity is excessively generated when a protective film attached to the polarizing plate is peeled, adversely affecting the orientation of liquid crystal in the liquid crystal display device. Thus, defects in image formation occur.

To avoid such generation of static electricity, an anti-static layer has been applied on the external surfaces of a polarizing plate or a base layer of a protective layer, but the effect is negligible and static electricity has yet to be adequately controlled. Therefore, an anti-static function needs to be added to an adhesive layer to fundamentally inhibit static electricity generation.

Conventional methods to provide an anti-static function to an adhesive layer are adding a material having a conductive component such as conductive a metal powder or a carbon particle, and adding an ionic or non-ionic material in the form of a surfactant. However, in the case of adding such an additive to impart an anti-static function, the required amount of such an additive is huge, and thus the additive is released to the surface of the adhesive agent, resulting in decrease in adhesive properties.

Korean Patent Application Publication No. 2004-0030919 describes anti-static effect by adding an organic salt in an amount of at least 5 weight %. However, according to this method, high priced organic salt has to be used in a large amount.

Korean Patent Application Publication No. 2006-0128659 discloses a method of preventing chlorosis under high temperature and high humidity conditions by adding a chelating agent capable of forming a complex with an alkali metal ion, and a metal salt. However, this method also has a problem of a decrease in low-rate peel strength due to a large amount of additives.

Japanese Laid-Open Patent Publication No. 2007-2111 discloses a technical idea of embodying ant-static properties as well as reducing the content of additives by using a copolymer of 1 to 60 parts by weight of a monomer including an alkylene oxide functional group are a side chain as a chelate of added metal ions. However, polarity of an adhesive is considerably increased and properties deteriorate with time according to durability evaluation. Thus, adhesive force is considerably increased, and anti-static properties are significantly deteriorated.

SUMMARY OF THE INVENTION

Therefore, the present invention has been made to solve the above and other technical problems that have yet to be resolved.

As a result of a variety of extensive and intensive studies and experiments to solve the problems as described above, the present inventors confirmed that, when acrylic resin particles are prepared using a copolymer of anti-static alkylene oxide unit-containing (meth)acrylic acid ester monomers and a reactive surfactant radical-polymerizable with the copolymer, and the acrylic resin particles are mixed with a cross-linking agent having a functional group that reacts with the acrylic resin particles in a predetermined ratio, excellent anti-static properties, low adhesion, and excellent re-peeling properties are obtained. The present invention has been completed, based on this discovery.

In accordance with one aspect of the present invention, provided is an adhesive composition for a protective film including acrylic emulsion resin particles and 0.5 to 5 parts by weight of an external cross-linking agent based on 100 parts by weight of the acrylic emulsion resin particles. The acrylic emulsion resin particles include a mixture including 80 to 99.9% by weight of a polymer of a (meth)acrylic acid ester monomer including a $C_1$-$C_{14}$ alkyl group and a (meth)acrylic acid ester monomer including an alkylene oxide unit, and 0.1 to 20% by weight of a monomer including a carboxyl group and/or a hydroxyl group or a combination thereof, and 5 to 30 parts by weight of a reactive emulsifier having a double bond structure radical-polymerizable with the polymer and including an alkylene oxide unit based on 100 parts by weight of the mixture.

The adhesive composition for a protective film according to the present invention may minimize generation of static electricity during peeling without adding an anti-static agent thereto by cross-linking high molecular weight acrylic adhesive resin particles including a hydrophilic alkylene oxide unit and minimize a phenomenon in which an emulsifier is transferred to the surface of an object to which the protective film is attached using a reactive emulsifier.

In detail, the (meth)acrylic acid ester monomer including a $C_1$-$C_{14}$ alkyl group forms a polymer with the monomer including an alkylene oxide unit to improve cohesive force of the acrylic adhesive resin particles.

According to an embodiment of the present invention, the (meth)acrylic acid ester monomer including a $C_1$-$C_{14}$ alkyl group may include at least one compound selected from the group consisting of methyl (meth)acrylate, ethyl (meth)acrylate, propyl(meth)acrylate, isopropyl(meth)acrylate, butyl (meth)acrylate, t-butyl(meth)acrylate, 2-ethylhexyl(meth) acrylate, octyl(meth)acrylate, and lauryl(meth)acrylate.

The (meth)acrylic acid ester monomer including an alkylene oxide unit provides anti-static properties in the acrylic adhesive resin particles and may include at least one compound selected from the group consisting of polyethylene glycol(meth)acrylate, polypropylene glycol(meth)acrylate, polyethylene glycol-polypropylene glycol(meth)acrylate, polyethylene glycol-polybutylene glycol(meth)acrylate, polypropylene glycol-polybutylene glycol(meth)acrylate, methoxypolyethylene glycol(meth)acrylate, ethoxypolyethylene glycol(meth)acrylate, butoxypolyethylene glycol (meth)acrylate, octoxypolyethylene glycol(meth)acrylate, lauroxypolyethylene glycol(meth)acrylate, stearoxypolyethylene glycol(meth)acrylate, phenoxypolyethylene glycol (meth)acrylate, methoxypolypropylene glycol(meth)acrylate, and octoxypolyethylene glycol-polypropylene glycol (meth)acrylate, preferably alkoxypolyalkylene glycol mono (meth)acrylic acid ester monomer represented by Formula 1 below according to an embodiment of the present invention.

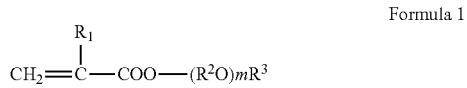

Formula 1

In Formula 1, $R^1$ may be a hydrogen atom or a methyl group.

$R^2O$ may include one or more $C_2$-$C_4$ ethylene oxides, which may be attached in blocks or randomly if there are two or more.

$R^3$ may be a $C_1$-$C_4$ alkyl group.

Here, m that is an average addition number of moles of ethylene oxide may be an integer of 6 to 17 alkylene oxide.

The content of the (meth)acrylic acid ester monomer including an alkylene oxide unit may be in the range of 5 to 15% by weight based on the total weight of the polymer. If the content of the (meth)acrylic acid ester monomer including an alkylene oxide unit is less than 5% by weight, desired anti-static properties may not be obtained. On the other hand, if the content of the (meth)acrylic acid ester monomer including an alkylene oxide unit is greater than 15% by weight, cohesive force of the polymer may be reduced.

In addition, the content of the polymer may be in the range of 80 to 99.9% by weight based on the total weight of the polymer and the monomer including the carboxyl group and/ or a hydroxyl group or a combination thereof. If the content of the polymer is less than 80% by weight, desired adhesive force may not be obtained.

The monomer including a carboxyl group and/or a hydroxyl group or a combination thereof reacts with the external cross-linking agent to improve cohesive force and adhesive force to the film, such that transfer of an adhesive resin to the surface of a base during peeling of the protective film may be prevented.

According to an embodiment of the present invention, the monomer including a carboxyl group may include at least one compound selected from the group consisting of maleic anhydride, fumaric acid, crotonic acid, itaconic acid, acrylic acid, and methacrylic acid, and the monomer including a hydroxyl group may include at least one compound selected from the group consisting of hydroxyethyl(meth)acrylate, hydroxypropyl(meth)acrylate, hydroxybutyl(meth)acrylate, hydroxyhexyl(meth)acrylate, hydroxyoctyl(meth)acrylate, hydroxylauryl(meth)acrylate, and hydroxypropyl glycol (meth)acrylate.

The content of the monomer including a carboxyl group and/or a hydroxyl group or a combination thereof may be in the range of 0.1 to 20% by weight based on the total weight of the polymer and the monomer including a carboxyl group and/or a hydroxyl group or a combination thereof.

If the content of the monomer including a carboxyl group and/or a hydroxyl group or a combination thereof is less than 0.1% by weight, the degree of cross-linking with the external cross-linking agent is not sufficient, thereby contaminating the surface of the base during peeling of the protective film. On the other hand, if the content of the monomer including a carboxyl group and/or a hydroxyl group or a combination thereof is greater than 20% by weight, adhesive force may be reduced due to strong cohesive force of the adhesive resin.

Meanwhile, if required, an internal cross-linking agent may further be added to the mixture in order to prevent transfer of the adhesive resin to the surface of the base during peeling by reinforcing the cohesive force of the adhesive resin and improving adhesive force to the film and to maintain appropriate low peel strength as a protective film.

In this regard, the content of the internal cross-linking agent may be in the range of 0.1 to 10% by weight based on the total weight of the polymer, the monomer including a carboxyl group and/or a hydroxyl group or a combination thereof, and the internal cross-linking agent.

Here, the mixture may be a mixture including 80 to 99.9% by weight of the polymer, 0.1 to 19.9% by weight of the monomer including a carboxyl group and/or a hydroxyl group or a combination thereof, and 0.1 to 10% by weight of the internal cross-linking agent including an acrylate group or a vinyl group.

If the content of the internal cross-linking agent is less than 0.1% by weight, the degree of internal cross-linking or cohesive force is not sufficient. Thus, sufficient durability may not be obtained, and accordingly the content of the external cross-linking agent is increased. If the content of the internal cross-linking agent is greater than 10% by weight, the adhesive force of the protective film may be reduced due to strong cohesive force of the adhesive resin.

The internal cross-linking agent may be an organic cross-linking agent having at least two radical-polymerizable unsaturated groups during emulsion polymerization and may include at least one compound selected from the group consisting of allyl methacrylate, polyethylene glycol diacrylate, polypropylene glycol diacrylate, ethylene glycol diacrylate, ethylene glycol dimethacrylate, hexanediol ethoxy diacrylate, ethylene glycol dimethacrylate, hexanediol ethoxylate diacrylate, hexanediol propoxylate diacrylate, neopentyl glycol ethoxylate diacrylate, neopentyl glycol propoxylate diacrylate, trimethylpropane ethoxylate triacrylate, trimethylpropane propoxylate triacrylate, pentaerythritol ethoxylate triacrylate, pentaerythritol propoxylate triacrylate, vinyltrimethoxysilane, and divinylbenzene, but is not limited thereto. More preferably, the internal cross-linking agent may be allyl methacrylate.

In addition, the acrylic adhesive resin particles according to the present invention include 5 to 30 parts by weight of the reactive emulsifier having a double bond structure radical-polymerizable with the polymer and including an alkylene oxide unit based on 100 parts by weight of the mixture.

The reactive emulsifier, as a surfactant, generates particles at an early stage of polymerization, controls particle size of generated particles, maintains stability of the particles during polymerization, provides excellent wettability and anti-static properties due to the hydrophilic alkylene oxide unit, and is radical-polymerized with the polymer to form a copolymer, thereby further improving cohesive force. As a result, transfer of the adhesive agent to the object to which the protective film is attached is prevented even when the number of the alkylene oxide units increases.

According to an embodiment of the present invention, the reactive emulsifier having the double bond structure and including the alkylene oxide unit may be alkyl ether polyalkylene oxide sulfonate.

In this regard, the number of the alkylene oxide unit may be in the range of 5 to 50. If the number of the alkylene oxide unit is less than 5 or greater than 50, stability as an emulsifier may be reduced. In addition, the alkyl group of the alkyl ether may include 9 to 11 carbon atoms, and the emulsifier may have a double-bond structure radical-polymerizable with the polymer.

The reactive emulsifier including the alkylene oxide unit may be ammonium alkyl ether polyethylene oxide sulfonate represented by Formula 2 below.

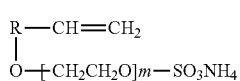

Formula 2

In Formula 2, R is a $C_1$-$C_9$ alkyl group, and m is 5 to 50. More preferably, R may be a $C_7$-$C_9$ alkyl group.

The acrylic adhesive resin particles are cross-linked by the external cross-linking agent to improve adhesive force. The external cross-linking agent, as a chemical cross-linking agent may be an organic cross-linking agent or inorganic cross-linking agent, and may be contained in an amount of 0.5 to 5 parts by weight based on 100 parts by weight of the acrylic emulsion resin particles. If the content of the external cross-linking agent is less than 0.5 parts by weight, increase in adhesive force through use of the external cross-linking agent is negligible. On the other hand, if the content of the external cross-linking agent is greater than 5 parts by weight, the adhesive force is not increased any further.

The organic cross-linking agent may be an aziridine cross-linking agent. The aziridine cross-linking agent may be an aziridine cross-linking agent including tris[([β]-N-aziridinyl) propionate], preferably, trimethylolpropane tris[([β]-N-2-methyl-1-aziridinyl)propionate] or pentaerythritol tris[([β]-N-2-aziridinyl) propionate].

In addition, the inorganic cross-linking agent may include at least one metal chelate including a metal chelate-based compound selected from the group consisting of aluminum acetylacetonate, aluminum acetate, zinc acetate, chromium acetate, zinc ammonium carbonate, and zirconium ammonium carbonate.

According to an embodiment of the present invention, the adhesive composition for a protective film may be manufactured by preparing a mixture including 80 to 99.9% by weight of a polymer of a (meth)acrylic acid ester monomer including a $C_1$-$C_{14}$ alkyl group and a (meth)acrylic acid ester monomer including an alkylene oxide unit, and 0.1 to 20% by weight of a monomer including a carboxyl group and/or a hydroxyl group or a combination thereof, polymerizing acrylic resin particles by adding 5 to 30 parts by weight of a reactive surfactant including a double bond structure radical-polymerizable with the polymer thereto to 100 parts by weight of the mixture, and dispersing 0.5 to 5 parts by weight of an external cross-linking agent in 100 parts by weight of the acrylic emulsion resin particles.

The mixture may further include 0.1 to 10% by weight of the internal cross-linking agent including an acrylate group or a vinyl group. In this regard, the content of the polymer may be in the range of 80 to 99% by weight, and the content of the monomer including a carboxyl group and/or a hydroxyl group or a combination thereof may be in the range of 0.1 to 19.9% by weight.

The polymerization initiator may include at least one compound selected from the group consisting of ammonium persulfate or persulfate of an alkali metal and hydrogen peroxide.

The acrylic resin prepared according to the method described above is used as a main component of the adhesive agent after being neutralized using an alkaline substance. The alkaline substance may be inorganic materials such as hydroxides, chlorides, and carbonates of monovalent or bivalent metals, ammonia, or organic amine, preferably ammonia.

An adhesive composition for a protective film according to the present invention may be prepared by dispersing a solution of an aziridine cross-linking agent or inorganic cross-linking agent in the neutralized acrylic adhesive resin.

According to the present invention, a protective film with one or both surfaces coated with the adhesive composition for a protective film is also provided.

Effects of Invention

The adhesive composition for a protective film according to the present invention may minimize generation of static electricity during peeling without adding an anti-static agent thereto by cross-linking high molecular weight acrylic adhesive resin particles including a hydrophilic alkylene oxide unit and minimize a phenomenon in which an emulsifier is transferred to the surface of the object to which the protective film is attached by using a reactive emulsifier.

DETAILED DESCRIPTION OF PREFERRED EMBODIMENTS

Now, the present invention will be described in more detail with reference to the following examples. These examples are provided only to illustrate the present invention and should not be construed as limiting the scope and spirit of the present invention.

Example 1

Preparation of Acrylic Adhesive Agent 300 g of distilled water was added to a 3 L glass reactor equipped with a stirring blade, a thermometer, a nitrogen gas inlet, and a reflux condenser, and the reactor was purged with nitrogen while stirring. The reactor was heated to 70° C. under a nitrogen atmosphere and maintained for 30 minutes.

Separately, a solution including 50 g (20 wt %) of ammonium nonyl ether polyethylene oxide sulfonate having a carbon-carbon double bond structure (#EO=5), 2 g of sodium carbonate, and 500 g of distilled water was added to a monomer mixture including 500 g of butylacrylate (BA), 370 g of 2-ethylhexylacrylate (2-EHA), 100 g of methoxypolyethylene glycol mono(meth)acrylic acid ester monomer (number of ethylene oxide units: 11 (#EO=11)), 20 g of acrylic acid (AA), and 10 g of allyl methacrylate (AMA) to prepare an emulsifier.

The emulsifier and 120 g (3 wt %) an aqueous ammonium persulfate solution were added to the glass reactor over 4 hours, and then 20 g (3 wt %) of an aqueous ammonium persulfate solution was further added to the reactor. Then, the reactor was heated to 80° C. for 30 minutes, maintained at 80° C. for 1 hour and cooled to room temperature to prepare an acrylic resin emulsion.

28% by weight of an aqueous ammonium solution was added to the acrylic resin emulsion to adjust the pH of the mixture to 7.5.

Preparation of Protective Film Coated with Adhesive Agent 1 g of trimethylolpropane tris-(1-(2-methyl)aziridino)propionate, as an external cross-linking agent, was added to 100 g of the acrylic resin emulsion, and the mixture was stirred for 120 minutes. Then, the acrylic resin emulsion was coated on a 38 μm PET film and dried in an oven at 80° C. for 2 minutes to allow an acrylic adhesive resin layer to have a thickness of 20 μm. The resultant was laminated with release paper to prepare an adhesive tape.

Example 2

An experiment was performed in the same manner as in Example 1, except that #EO=5 was changed to #EO=10 in the ammonium nonyl ether polyethylene oxide sulfonate having a carbon-carbon double bond structure used as a reactive surfactant in the monomer composition of Example 1.

Example 3

An experiment was performed in the same manner as in Example 1, except that #EO=5 was changed to #EO=30 in the ammonium nonyl ether polyethylene oxide sulfonate having a carbon-carbon double bond structure used as a reactive surfactant in the monomer composition of Example 1.

Example 4

An experiment was performed in the same manner as in Example 1, except that #EO=5 was changed to #EO=40 in the ammonium nonyl ether polyethylene oxide sulfonate having a carbon-carbon double bond structure used as a reactive surfactant in the monomer composition of Example 1, and the amount thereof was 30 g instead of 50 g.

Example 5

An experiment was performed in the same manner as in Example 1, except that #EO=5 was changed to #EO=50 in the ammonium nonyl ether polyethylene oxide sulfonate having a carbon-carbon double bond structure used as a reactive surfactant in the monomer composition of Example 1, and the amount thereof was 30 g instead of 50 g.

Example 6

An experiment was performed in the same manner as in Example 2, except that the amount of the ammonium nonyl ether polyethylene oxide sulfonate having a carbon-carbon double bond structure (#EO=10) used as a reactive surfactant was 100 g instead of 50 g.

Example 7

An experiment was performed in the same manner as in Example 2, except that the amount of the ammonium nonyl ether polyethylene oxide sulfonate having a carbon-carbon double bond structure (#EO=10) used as a reactive surfactant was 200 g instead of 50 g.

Example 8

An experiment was performed in the same manner as in Example 2, except that the amount of the ammonium nonyl ether polyethylene oxide sulfonate having a carbon-carbon double bond structure (#EO=10) used as a reactive surfactant was 300 g instead of 50 g.

Comparative Example 1

An experiment was performed in the same manner as in Example 1, except that 50 g of ammonium nonyl ether polyethylene oxide sulfonate having a carbon-carbon double bond structure (#EO=10) and 50 g (20 wt %) of sodium polyoxyethylene lauryl ether sulfonate were used instead of 50 g of ammonium nonyl ether polyethylene oxide sulfonate having a carbon-carbon double bond structure (#EO=5).

Comparative Example 2

An experiment was performed in the same manner as in Example 1, except that 50 g (20 wt %) of sodium polyoxyethylene lauryl ether sulfonate and 50 g (20 wt %) of an aqueous polyoxyethylene lauryl ether solution were used instead of 50 g ammonium nonyl ether polyethylene oxide sulfonate having a carbon-carbon double bond structure (#EO=5).

Comparative Example 3

An experiment was performed in the same manner as in Comparative Example 1, except that 100 g (20 wt %) of sodium polyoxyethylene lauryl ether sulfonate was used instead of 50 g of ammonium nonyl ether polyethylene oxide sulfonate having a carbon-carbon double bond structure (#EO=10) and 50 g (20 wt %) of sodium polyoxyethylene lauryl ether sulfonate.

Comparative Example 4

An experiment was performed in the same manner as in Comparative Example 1, except that 100 g (20 wt %) of polyoxyethylene lauryl ether was used instead of 50 g of ammonium nonyl ether polyethylene oxide sulfonate having a carbon-carbon double bond structure (#EO=10) and 50 g (20 wt %) of sodium polyoxyethylene lauryl ether sulfonate.

Test Example

Adhesive properties of the acrylic emulsion adhesive agents prepared in the examples and comparative examples were measured using the following methods. The results are shown in Table 1 below.

Measurement of Surface Resistance

Surface resistance of at least four portions of the prepared PET film coated with the prepared aqueous acrylic emulsion adhesive agent was measured using a four-point probe surface resistivity meter (Mitsubishi) for 30 seconds, and an average obtained therefrom was used as a surface resistance.

Peel Strength Test

Adhesive force of an adhesive tape sample was measured according to JIS Z 0237. The adhesive tape was attached to a substrate via two reciprocations of a 2 kg roller at 300 mm/min and aged at room temperature for 1 day. Then, peel strength was measured while a strip of the adhesive tape was peeled at 300 mm/min using a TA Texture Analyzer at an angle of 180°.

Test of Long-Term Contamination Under High Temperature and High Humidity Conditions An adhesive sheet having a size of 140 mm×25 mm was attached to a glass plate and the structure was stored in a constant-temperature and constant-humidity oven at 50° C. at 85% for 3 days. After maintaining it at room temperature for 10 minutes, the adhesive sheet was peeled off. Marks or residuals left on the glass from the adhesive sheet were evaluated as a five-point system.

TABLE 1

| | Contamination under high temperature and high humidity[1] | Surface resistance ($\Omega/\square$) | Peel strength (gf/in) |
|---|---|---|---|
| Example 1 | 1 | $5.6 \times 10^{12}$ | 32 |
| Example 2 | 0 | $4.8 \times 10^{12}$ | 35 |
| Example 3 | 0 | $2.1 \times 10^{12}$ | 31 |
| Example 4 | 2 | $6.3 \times 10^{11}$ | 26 |
| Example 5 | 2 | $8.8 \times 10^{10}$ | 45 |
| Example 6 | 1 | $1.3 \times 10^{11}$ | 38 |
| Example 7 | 1 | $7.6 \times 10^{10}$ | 40 |
| Example 8 | 2 | $5.9 \times 10^{10}$ | 67 |
| Comparative Example 1 | 3 | OVER RANGE | 31 |
| Comparative Example 2 | 3 | $7.0 \times 10^{11}$ | 43 |
| Comparative Example 3 | 4 | $1.2 \times 10^{12}$ | 55 |
| Comparative Example 4 | 5 | $1.7 \times 10^{12}$ | 44 |

[1] 0-5: As the grade decreases, transfer to the surface after the protective film is peeled decreases.

Referring to Table 1, it can be seen that long-term contamination under high temperature and high humidity conditions of the protective films prepared in Examples 1 to 8 according to the present invention was improved compared to those prepared in Comparative examples 1, 3, and 4 in which the reactive emulsifier and a general emulsifier were used together, and Comparative Example 2 in which two types of general emulsifiers were used. That is, the transfer of the protective films to the surface of the object to which the protective film was attached was reduced after the protective films prepared in Examples 1 to 8 were peeled compared to the protective films prepared in Comparative Examples 1 to 4.

In addition, referring to the examples, as the number of ethylene oxide units or the content of the reactive surfactant increased, the surface resistance was reduced. Particularly, as the number of the ethylene oxide units increased as in Examples 1 to 5, the surface resistance was reduced. As the content of the reactive surfactant increased as in Example 2 and Examples 6 to 8, the surface resistance was reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An adhesive composition for a protective film comprising acrylic emulsion resin particles and 0.5 to 5 parts by weight of an external cross-linking agent based on 100 parts by weight of the acrylic emulsion resin particles, wherein the acrylic emulsion resin particles comprise a polymer of a mixture comprising 80 to 99.9% by weight of a (meth)acrylic acid ester monomer comprising a $C_1$-$C_{14}$ alkyl group and a (meth)acrylic acid ester monomer comprising an alkylene oxide unit, and 0.1 to 20% by weight of a monomer comprising a carboxyl group and/or a hydroxyl group or a combination thereof; and 5 to 30 parts by weight of a reactive emulsifier of Formula 2 based on 100 parts by weight of the mixture, wherein Formula 2 is as follows:

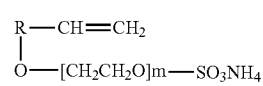

Formula 2 wherein R is a $C_1$-$C_9$ alkylene group, and m in Formula 2 is in the range of 5 to 50.

2. The adhesive composition according to claim 1, wherein the (meth)acrylic acid ester monomer comprising a $C_1$-$C_{14}$ alkyl group comprises at least one compound selected from the group consisting of methyl (meth)acrylate, ethyl (meth)acrylate, propyl(meth)acrylate, isopropyl(meth)acrylate, butyl (meth)acrylate, t-butyl(meth)acrylate, 2-ethylhexyl (meth)acrylate, octyl(meth)acrylate, and lauryl(meth)acrylate.

3. The adhesive composition according to claim 1, wherein the (meth)acrylic acid ester monomer comprising an alkylene oxide unit comprises at least one compound selected from the group consisting of polyethylene glycol(meth)acrylate, polypropylene glycol(meth)acrylate, polyethylene glycol-polypropylene glycol(meth)acrylate, polyethylene glycol-polybutylene glycol(meth)acrylate, polypropylene glycol-polybutylene glycol(meth)acrylate, methoxypolyethylene glycol(meth)acrylate, ethoxypolyethylene glycol(meth)acrylate, butoxypolyethylene glycol(meth)acrylate, octoxypolyethylene glycol(meth)acrylate, lauroxypolyethylene glycol (meth)acrylate, stearoxypolyethylene glycol(meth)acrylate, phenoxypolyethylene glycol(meth)acrylate, methoxypolypropylene glycol(meth)acrylate, and octoxypolyethylene glycol-polypropylene glycol(meth)acrylate.

4. The adhesive composition according to claim 1, wherein the (meth)acrylic acid ester monomer comprising an alkylene oxide unit is alkoxypolyalkylene glycol mono(meth)acrylic acid ester monomer represented by Formula 1 below:

Formula 1

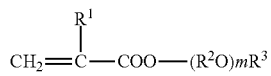

wherein $R^1$ is a hydrogen atom or a methyl group, $R^2O$ comprises one or more $C_2$-$C_4$ ethylene oxides, which may be attached in blocks or randomly if there are two or more, $R^3$ is a $C_1$-$C_4$ alkyl group, and m in Formula 1, as an average addition number of moles of ethylene oxide, is an integer of 6 to 17.

5. The adhesive composition according to claim 1, wherein the monomer comprising a carboxyl group comprises at least one compound selected from the group consisting of maleic anhydride, fumaric acid, crotonic acid, itaconic acid, acrylic acid, and methacrylic acid, and the monomer comprising a hydroxyl group comprises at least one compound selected from the group consisting of hydroxyethyl(meth)acrylate, hydroxypropyl(meth)acrylate, hydroxybutyl(meth)acrylate, hydroxyhexyl(meth)acrylate, hydroxyoctyl(meth)acrylate, hydroxylauryl(meth)acrylate, and hydroxypropyl glycol(meth)acrylate.

6. The adhesive composition according to claim 1, wherein the mixture comprises 80 to 99.9% by weight of the (meth)acrylic acid ester monomer comprising a $C_1$-$C_{14}$ alkyl group and a (meth)acrylic acid ester monomer comprising an alkylene oxide unit, 0.1 to 19.9% by weight of the monomer comprising a carboxyl group and/or a hydroxyl group or a combination thereof, and 0.1 to 10% by weight of an internal cross-linking agent comprising an acrylate group or a vinyl group.

7. The adhesive composition according to claim 6, wherein the internal cross-linking agent comprises at least one compound selected from the group consisting of allyl methacrylate, polyethylene glycol diacrylate, polypropylene glycol diacrylate, ethylene glycol diacrylate, ethylene glycol dimethacrylate, hexanediol ethoxylate diacrylate, ethylene glycol dimethacrylate, hexanediol ethoxylate diacrylate, hexanediol propoxylate diacrylate, neopentyl glycol ethoxylate diacrylate, neopentyl glycol propoxylate diacrylate, trimethylpropane ethoxylate triacrylate, trimethylpropane propoxylate triacrylate, pentaerythritol ethoxylate triacrylate, pentaerythritol propoxylate triacrylate, vinyltrimethoxysilane, and divinylbenzene.

8. The adhesive composition according to claim 1, wherein the reactive emulsifier is an ammonium nonylene ether polyethylene oxide sulfonate having a carbon-carbon double bond structure.

9. The adhesive composition according to claim 1, wherein the external cross-linking agent is an organic cross-linking agent or an inorganic cross-linking agent.

10. The adhesive composition according to claim 9, wherein the organic cross-linking agent is an aziridine cross-linking agent.

11. The adhesive composition according to claim 9, wherein the inorganic cross-linking agent comprises at least one compound selected from the group consisting of aluminum acetylacetonate, aluminum acetate, zinc acetate, chromium acetate, zinc ammonium carbonate, and zirconium ammonium carbonate.

12. A method of manufacturing an adhesive composition for a protective film, the method comprising:

preparing a monomer mixture comprising 80 to 99.9% by weight of a (meth)acrylic acid ester monomer comprising a $C_1$-$C_{14}$ alkyl group and a (meth)acrylic acid ester monomer comprising an alkylene oxide unit, and 0.1 to 20% by weight of a monomer comprising a carboxyl group and/or a hydroxyl group or a combination thereof;

performing a polymerization by adding 5 to 30 parts by weight of a reactive surfactant of Formula 2 and 0.1 to 3 parts by weight of a polymerization initiator to 100 parts by weight of the monomer mixture; and dispersing 0.5 to 5 parts by weight of an external cross-linking agent in 100 parts by weight of the monomer mixture, wherein Formula 2 is as follows:

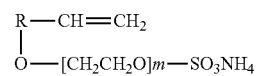

Formula 2 wherein R is a $C_1$-$C_9$ alkylene group, and m in Formula 2 is in the range of 5 to 50.

13. The method according to claim 12, wherein the monomer mixture comprises 80 to 99.9% by weight of the (meth)acrylic acid ester monomer comprising a $C_1$-$C_{14}$ alkyl group and a (meth)acrylic acid ester monomer comprising an alkylene oxide unit, 0.1 to 19.9% by weight of the monomer comprising a carboxyl group and/or a hydroxyl group or a combination thereof, and 0.1 to 10% by weight of an internal cross-linking agent comprising an acrylate group or a vinyl group.

14. The method according to claim 12, wherein the polymerization initiator comprises at least one compound selected from the group consisting of ammonium persulfate or persulfate of an alkali metal and hydrogen peroxide.

15. A protective film formed by coating an adhesive composition according to claim 1 on one or both surfaces of a film.

* * * * *